United States Patent
Uda

(10) Patent No.: US 7,039,272 B2
(45) Date of Patent: May 2, 2006

(54) OPTICAL TRANSMISSION EQUIPMENT WITH DISPERSION COMPENSATION, AND DISPERSION COMPENSATING METHOD

(75) Inventor: Tetsuya Uda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 10/645,870

(22) Filed: Aug. 22, 2003

(65) Prior Publication Data

US 2004/0190820 A1     Sep. 30, 2004

(30) Foreign Application Priority Data

Mar. 26, 2003   (JP)   ............... 2003-084080

(51) Int. Cl.
*G02B 6/28* (2006.01)
*H04J 14/02* (2006.01)

(52) U.S. Cl. ..................... 385/24; 385/27; 398/81; 398/83

(58) Field of Classification Search .......... 398/79, 398/81–83; 385/24, 27
See application file for complete search history.

(56) References Cited

U.S. PATENT DOCUMENTS 5,943,151 A * 8/1999 Grasso et al. ............... 398/147
6,577,438 B1 * 6/2003 Sugawara et al. ........ 359/337.11
2001/0024544 A1 * 9/2001 Matsuoka et al. ............ 385/24
2002/0105695 A1 * 8/2002 DeGrange et al. .......... 359/127
2003/0198473 A1 * 10/2003 Sekiya et al. ................. 398/81

FOREIGN PATENT DOCUMENTS

| JP | 07-74699 | 3/1995 |
| JP | 08-307347 | 11/1996 |
| JP | P2001-257642 A | 9/2001 |
| JP | P2001-268056 A | 9/2001 |

* cited by examiner

*Primary Examiner*—Sung Pak
*Assistant Examiner*—Omar Rojas
(74) *Attorney, Agent, or Firm*—McDermott Will & Emery LLP

(57) ABSTRACT

In a wavelength-division multiplexing system with an OADM, part of the chromatic dispersion on a transmission line is compensated for by a chromatic dispersion compensator for a dropped wavelength of the wavelength-division multiplexing system. Also, chromatic dispersion is compensated for by a chromatic dispersion compensator for an added wavelength of the wavelength-division multiplexing system. The chromatic dispersion compensator for dropped wavelength acts on the signal dropped by the OADM, and the chromatic dispersion compensator for added wavelength acts on the added signal. Both the chromatic dispersion compensators act on the passing signal. With the chromatic dispersion compensators being mounted in the optical transmission apparatus before the system is upgraded to OADM, it is not necessary to alter the chromatic dispersion compensating method and the variation of the communication quality can be suppressed.

5 Claims, 11 Drawing Sheets

OPTICAL TRANSMISSION EQUIPMENT WITH DISPERSION COMPENSATION, AND DISPERSION COMPENSATING METHOD

BACKGROUND OF THE INVENTION

The present invention relates to an optical transmission apparatus and compensating method with capabilities of effective compensation for the chromatic dispersion of optical fibers as transmission lines, and of avoiding the dispersion compensation method alteration and adjustment when the relay unit is upgraded to the optical add drop multiplexer (abbreviated as OADM) in the wavelength-division multiplexing optical transmission system.

As means for a large transmission capacity of optical transmission system, the wavelength-division multiplexing (abbreviated WDM) transmission system is practically used in which a single optical fiber is used to transmit a plurality of optical signals with different wavelengths. In addition, an optical fiber amplifier such as an erbium-doped fiber amplifier (hereafter, referred to as optical amplifier) exhibits a characteristic of amplifying in block a plurality of optical signals over a wide range of wavelengths. Therefore, a combination of the WDM and optical amplifier can achieve the simultaneous amplification of a plurality of optical different-wavelength signals, with the result that a large-capacity, long-distance transmission can be realized economically and with simple construction.

However, the optical fiber as a transmission line has a chromatic dispersion characteristic under which the wavelengths of light propagating within the fiber transmit with different velocities. It follows that the signal waveforms deteriorate as the light propagates in the optical fiber. Therefore, a dispersion compensation fiber having a dispersion value opposite to that of the transmission line is introduced to combine with the transmission line, thereby reducing the effect of the chromatic dispersion of the transmission line. Thus, this technique reshapes the deteriorated signal waveforms to be correct waveforms.

Recently, demand has increased to change from the simple communication type in which communication is simply made between two points as represented by the point-to-point system. One approach would use a bus-shape OADM mode, in which communication is made between a plurality of points with a plurality of branches and inserts provided between the two opposite points, as represented by the bus-shape system, so that the optical signals can be transmitted therein as they are. Another approach would use a ring-shape OADM mode, in which communication is made between a plurality of points connected by branches and inserts in a ring shape, as represented by the ring-shape system, so that the optical signals can be transmitted therein as they are.

In this OADM mode, too, the dispersion compensation is extremely important in order to achieve an excellent transmission characteristic. Thus, the dispersion compensation technique is expected to be simpler and more excellent.

There is known a conventional dispersion compensation method in the wavelength-division multiplexing system. This conventional method considers the self-phase modulation effect in the relay transmission using the optical amplifier (for example, see JP-A-7-74699, the fourth to fifth items in FIG. 1.

In the wavelength-division multiplexing system of the OADM mode, a system-upgrading method is advantageous to reduce the introduction cost and increase the efficiency. In this upgrading method, the point-to-point system is built at the time of the initial introduction of the system. The OADM function is added later, with the increase of communication demand. At this time, before and after the system has been upgraded to add the OADM function, it is desired that there be no need to particularly alter or adjust other portions than the added OADM function.

However, the addition of OADM function actually causes the communication quality to degrade together with the reduction of optical signal-to-noise (S/N) ratio, and the system's performance to go down at the time of addition. In addition, the alteration of the dispersion compensation method greatly affects the system construction and network so as to change the communication quality.

In the conventional wavelength-division multiplexing system, the point-to-point system is dominantly demanded, but the bus-shape system or ring-shape system using the OADM equipment is not demanded so much. However, recently the wavelength-division multiplexing system has also been demanded to have high efficiency, and flexibility of network as the communication traffic and different kinds of data are increased, and the users have had an interest in the alteration of system construction due to the addition of OADM function. Particularly, the alteration of dispersion compensation method that has close relationship with the communication quality of the system becomes a factor of reducing the communication quality at the time of adding the OADM function, and thus it is one of the items to which utmost attention must be paid in the system construction.

In the technique described in the above-mentioned JP-A-7-74699, the waveform deterioration and timing jitter due to the nonlinear effect have been reduced by cutting to zero the total dispersion value after the points where the nonlinear effects such as the above self-phase modulation effect or mutual phase modulation effect occurred. However, this chromatic dispersion compensation method is described mainly about the application to the wavelength-division multiplexing system in the point-to-point system, but not about the wavelength-division multiplexing system having the OADM function and the upgrading to that system.

SUMMARY OF THE INVENTION

It is an object of the invention to provide a dispersion compensation method and apparatus capable of making stable dispersion compensation without giving any change to the existing equipment even when the point-to-point system is upgraded to an OADM system.

An optical transmission apparatus, according to one feature of the invention, transmits wavelength-division multiplexed light from a first optical transmission line to a second optical transmission line. The apparatus includes a first dispersion compensator for compensating for the chromatic dispersion that occurs while the wavelength-division multiplexed light is transmitted from a first point on the first optical transmission line to the optical transmission apparatus. A second dispersion compensator compensates for the waveform dispersion that occurs while the wavelength-division multiplexed light propagates from the optical transmission apparatus to a second point on the second optical transmission line, thereby carrying out dispersion compensation.

Thus, an add drop portion for realizing the OADM function can be mounted between the first and second dispersion compensators or demounted from between them. In addition, just before and after the mounting or demounting, those compensators do not affect the transmission characteristics of other signals including the dropped or added signal. Therefore, change of the communication quality due to the upgrading from the relay equipment to the OADM unit can be suppressed.

Other objects, features and advantages of the invention will become apparent from the following description of the embodiments of the invention taken in conjunction with the accompanying drawings.

DETAILED DESCRIPTION OF THE EMBODIMENTS

Figure 1:
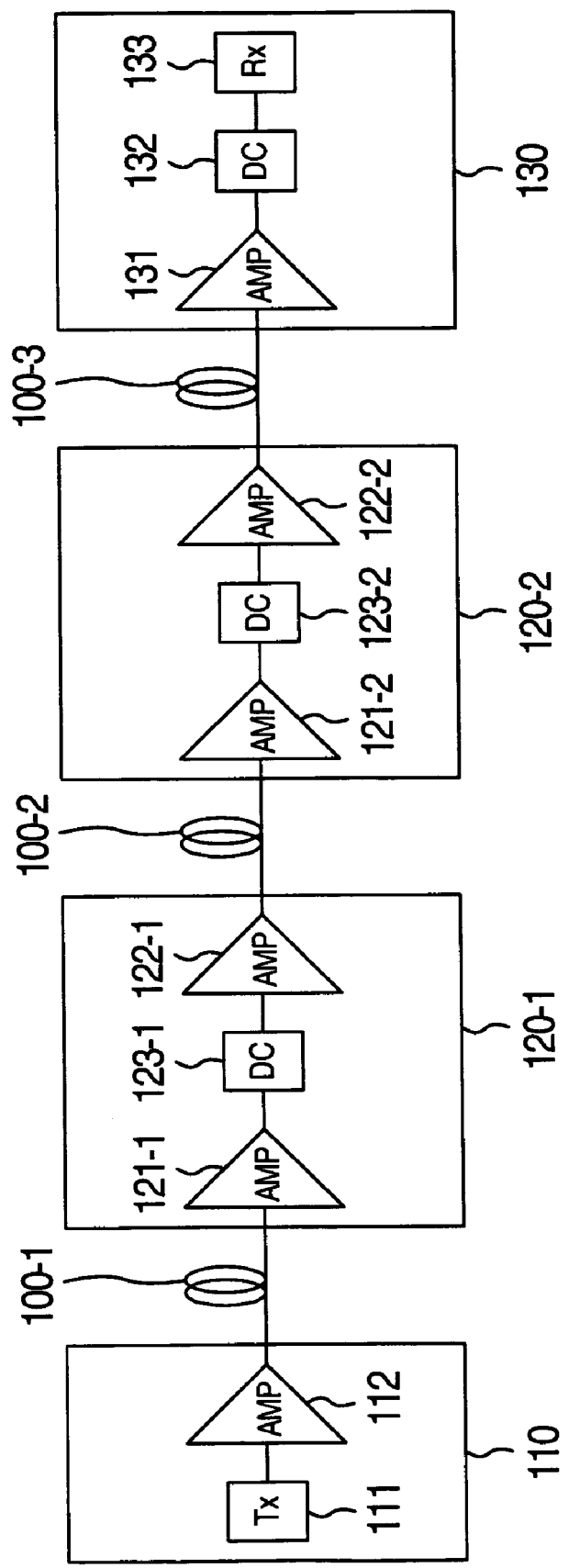
FIG. 1 is a diagram to which reference is made in explaining the principle of the first embodiment of the invention.

FIG. 1 diagrammatically shows the basic principle of the dispersion compensation method in the wavelength-division multiplexing system as the first embodiment of the invention. A transmission terminal 110 has an optical transmitter 111 and a preamplifier 112. In the transmission terminal 110, the optical transmitter 111 is actually formed of a plurality of optical transmitters the number of which corresponds to that of the wavelengths of the wavelength-division multiplexed optical signal emitted from the transmission terminal 110. In addition, a wavelength multiplexer not shown is provided to multiplex the wavelengths of the optical signals produced from the optical transmitters. The above description is also applicable to other embodiments which will be described later.

The optical signals generated from the optical transmitter 111 are amplified by the preamplifier 112, and supplied to an optical fiber 100-1 as a transmission line. A relay device 120 is provided to compensate for the light intensity lost during the time in which the optical signals are propagated in the optical fiber 100. In this case, the relay device 120 amplifies the attenuated optical signals, and again supplies the intensity-increased optical signals to the following-stage optical fiber 100 provided on the downstream side.

In this construction, the chromatic dispersion in the optical fiber 100 is compensated for by a dispersion compensator 123 mounted on the following relay device 120. For example, the dispersion in the optical fiber 100-1 is compensated for by a dispersion compensator 123-1 mounted on a relay device 120-1, and the dispersion in an optical fiber 100-2 by a dispersion compensator 123-2 mounted on a relay device 120-2.

After repetition of necessary stages according to the transmission distance or the like, the optical signals arrive at a receiving terminal 130. The receiving terminal 130 has a post-amplifier 131, a dispersion compensator 132, and an optical receiver 133 mounted thereon. The arriving optical signals are amplified by the post-amplifier 132. Then, after the dispersion in the optical fiber 100-3 is compensated for by the dispersion compensator 132, the optical signals are received by the optical receiver 133. In the receiving terminal 130, the optical receiver 133 is actually formed of a plurality of optical receivers the number of which corresponds to that of the wavelengths of the wavelength-division multiplexed optical signal. In addition, a wavelength separator not shown is provided therein to separate the optical signals of different wavelengths. This is also applicable to other embodiments which will be described later.

Figure 2:
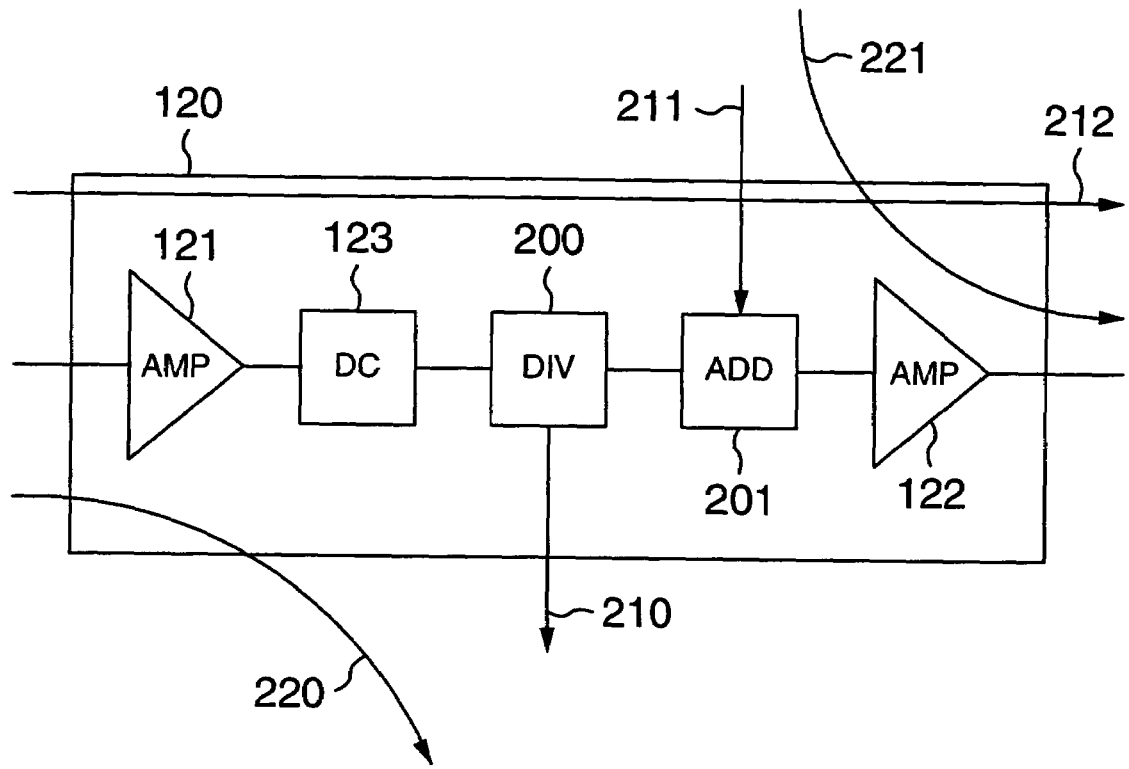
FIG. 2 is a diagram to which reference is made in explaining the first embodiment of the invention.

FIG. 2 shows an example of the construction of the relay device 120 having an OADM function as when the point-to-point system of FIG. 1 is upgraded to the OADM system. The upgraded relay device 120 has a wavelength dropping portion 200 and a wavelength adding portion 201 provided in addition to the non-upgraded construction in which the dispersion compensator 123 is provided between the separate optical amplifiers 121, 122.

In this upgraded relay device 120, like the non-upgraded one, the dispersion compensator 123 is mounted to compensate for the chromatic dispersion in the optical fiber 100 connected on the upstream side. In addition, the wavelength dropping portion 200 causes some of the wavelengths to be branched off, or dropped in the direction indicated by 220, or optical signals 210 of a certain wavelength band are separated and taken out. In addition, the wavelength adding portion 201 causes some wavelengths to be inserted, or added in the direction indicated by 221, or optical signals 211 of a certain wavelength band are multiplexed with the light fed from the dropping portion 200.

In this case, the transmission characteristic to which the optical signals fed directly through the relay device 120 to the receiver 133 are subjected can be made equal to the transmission characteristics exhibited to the optical signal 210 of a wavelength band fed from the transmitter 101 and dropped at the upgraded relay device 120 and to the optical signal 211 of a wavelength band added at this relay device 120 until they are thereafter transmitted and arrive at the corresponding receiver 133.

Figure 3:
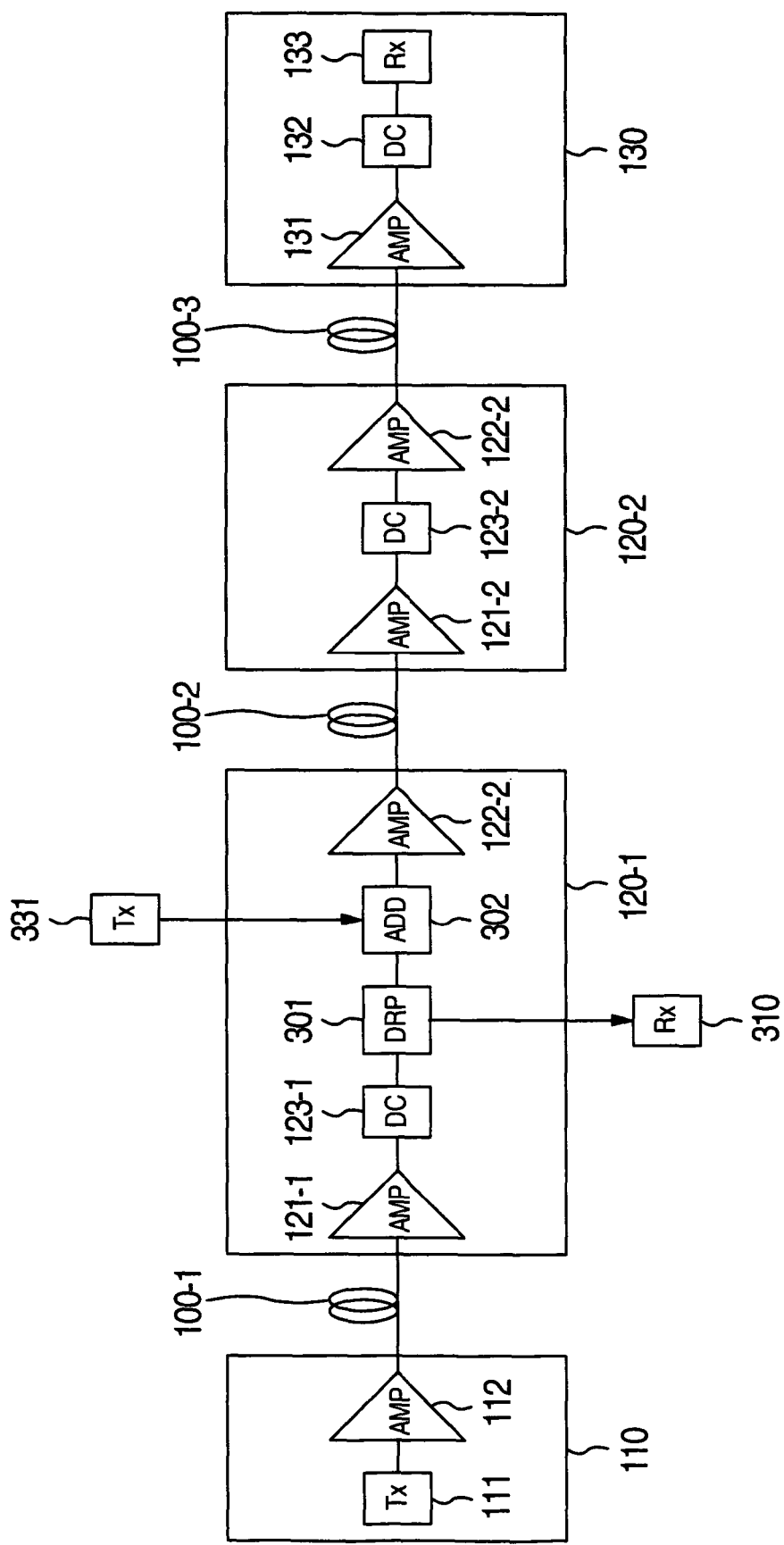
FIG. 3 is a diagram to which reference is made in explaining the first embodiment of the invention.

FIG. 3 shows the construction of an upgraded one of the point-to-point system of FIG. 1 in the case where the relay device 120-1 is changed to an upgraded relay device having the OADM function. The received wavelength-division multiplexed light is fed to the upgraded relay device 120-1, where the lost part of the light attenuated in the transmission line 100-1 is recovered by the optical amplifier 121-1 and then the chromatic dispersion caused in the transmission line 100-1 is compensated for by the chromatic dispersion compensator 123-1. At a wavelength dropping portion 301, an optical signal of a predetermined band is dropped from the compensated wavelength-division multiplexed light, and fed to an external device including an optical receiver 310. An optical signal from an external device including an optical transmitter 311 that produces the optical signal of a predetermined band is supplied to the upgraded relay device, where a wavelength adding portion 302 multiplexes it with the wavelength-division multiplexed light and an optical amplifier 122-2 amplifies the additionally-multiplexed light and supplies it to the transmission line 100-2.

As described above, the OADM function can be added to simply upgrade the relay device 120 with the same transmission characteristic kept, without changing the construction of other devices (such as the transmitting terminal 110, relay device 120-2 and receiving terminal 130) and with requiring no special adjustment.

However, when the transmission distance between the transmitting terminal 110 and receiving terminal 130 becomes long, the number of the stages of relay device 120 to be provided between them increases, resulting in the accumulation of the noise occurring in each relay device and the nonlinear effects of the optical fibers of the transmission line. This accumulation will sometimes limit the transmission capacity and transmission distance.

Figure 4:
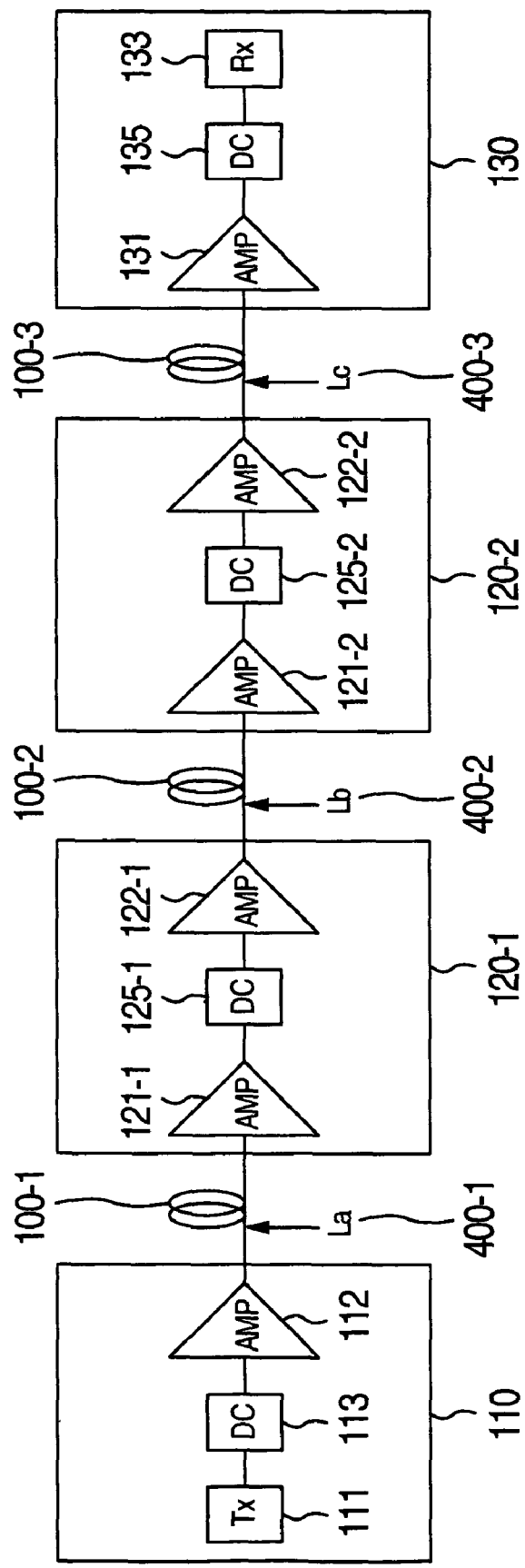
FIG. 4 is a diagram to which reference is made in explaining the principle of the second embodiment of the invention.

FIG. 4 is a diagram useful for explaining the chromatic dispersion in the second embodiment of the invention that considers the above nonlinear effect. A chromatic dispersion compensator 113 is provided in the transmitting terminal 110 in order to compensate for the chromatic dispersion occurring when the signal is transmitted from the transmitting terminal 110 up to a predetermined distance La 400-1 on the transmission line 100-1. Also, a chromatic dispersion compensator 125-1 is mounted in the relay device 120-1 in order to compensate for both the chromatic dispersions occurring in the remaining part of the transmission line 100-1 after the distance La 400-1 and in the range from the relay device 120-1 up to a predetermined distance Lb 400-2 on the transmission line 100-2.

A chromatic dispersion compensator 125-2 similarly mounted in the relay device 120-2 compensates for the chromatic dispersion occurring in the remaining part after the distance Lb 400-2 on the transmission line 100-2 and for the chromatic dispersion caused in the range from the relay device 120-2 up to a predetermined distance Lc 400-3 on the transmission line 100-3. A chromatic dispersion compensator 135 mounted in the receiving terminal 130 compensates for the chromatic dispersion caused in the remaining part of the transmission line 100-3 after the distance Lc 400-3.

Each of the predetermined distances La 400-1, Lb 400-2, Lc 400-3 is substantially uniquely determined in consideration of the optical fiber's characteristics, and is about 20 km. How to determine this distance is described in, for example, the above document 1.

Since the nonlinear effect can be reduced in the system in which the chromatic dispersion in the optical fiber is compensated for in this way, even a system having a large number of optical relay devices provided along a long distance fiber can be built to have excellent characteristics.

Here, let it be considered to upgrade the relay device 120 to a device having the OADM function. Under the upgrading method in which the wavelength dropping portion 301 and wavelength adding portion 302 are simply added after the chromatic dispersion compensator 123, the transmission characteristics of the respective optical wavelength signals before the upgrading cannot be made the same as those after the upgrading, because the amounts of the chromatic dispersion compensation in the above chromatic dispersion compensator 123 consider the chromatic dispersion occurring in the remaining part of the optical fiber provided before the corresponding relay device and the chromatic dispersion caused in the range from this relay device up to a predetermined distance on the next optical fiber provided after this relay device. Therefore, the optical signal of a predetermined wavelength band dropped at the wavelength dropping portion 301 is excessively compensated for its chromatic dispersion. In addition, the optical signal of a wavelength band added by the wavelength adding portion 302 is insufficiently compensated for its chromatic dispersion by the amount corresponding to the range from this relay device up to the predetermined distance on the optical fiber provided after this relay device.

Figure 5:
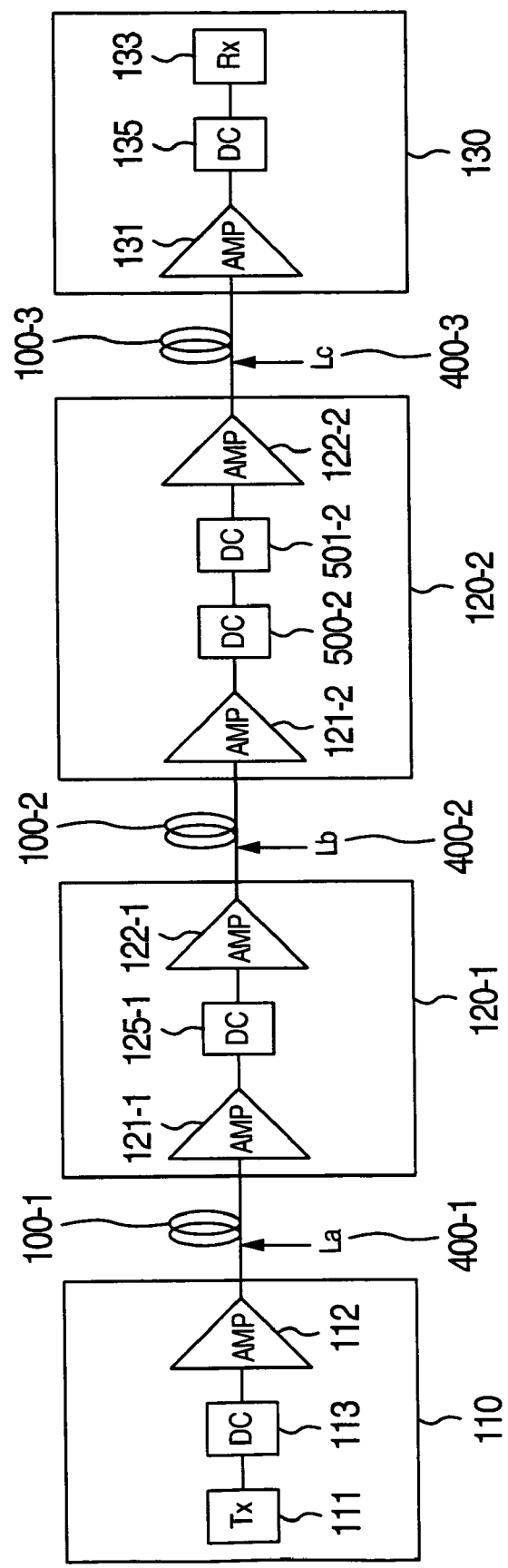
FIG. 5 is a diagram to which reference is made in explaining the second embodiment of the invention.

Thus, the relay device 120 that is expected to be upgraded to the device having the OADM function is previously constructed as shown in FIG. 5 at the relay device 120-2. In other words, referring to FIG. 5, two chromatic dispersion compensators 500-2, 501-2 are mounted in the relay device 120-2. The chromatic dispersion compensator 500-2 is constructed to compensate for the chromatic dispersion occurring in the remaining part of the transmission line 100-2 after the predetermined distance Lb 400-2 (on the relay device 120-2 side). The chromatic dispersion compensator 501-2 is constructed to compensate for the chromatic dispersion caused in the range from the relay device up to the predetermined distance Lc 400-3 on the transmission line 100-3. That is, the function of the chromatic dispersion compensator 125-2 in FIG. 4 is replaced by the two chromatic dispersion compensators 500-2, 501-2. Therefore, since the nonlinear effect can be reduced like the case shown in FIG. 4, even a system having a large number of optical relay devices along a long distance fiber can be built to have excellent characteristics.

Figure 6:
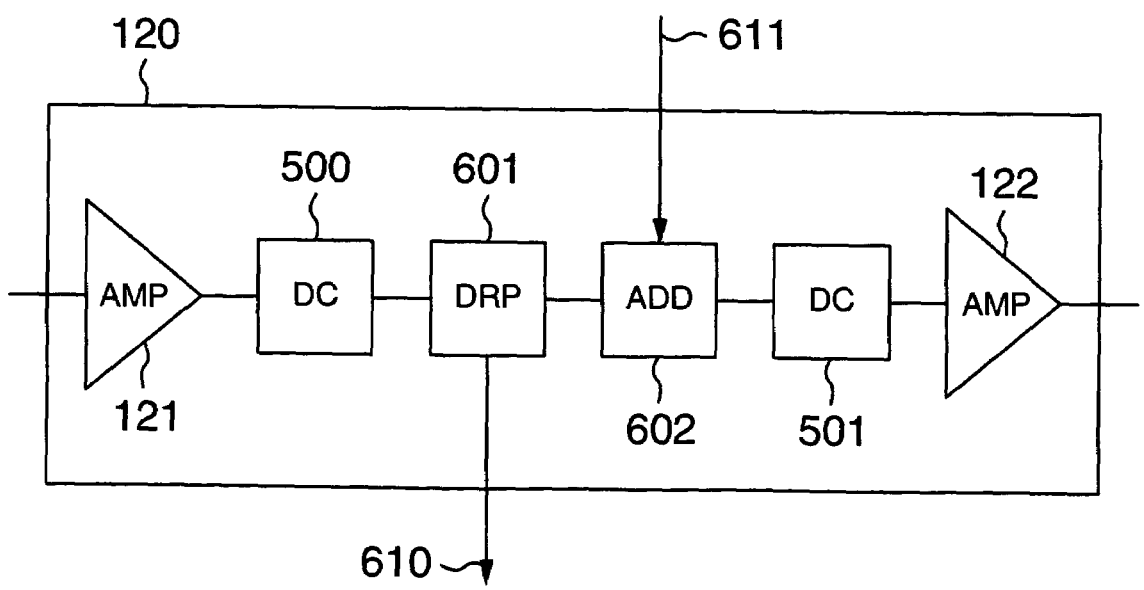
FIG. 6 is a diagram to which reference is made in explaining the second embodiment of the invention.

A method of upgrading the optical relay device 120-2 in FIG. 5 to a device having the OADM function will be described below. As shown in FIG. 6, a wavelength dropping portion 601 and a wavelength adding portion 602 are added between the chromatic dispersion compensators 500, 501 of the relay device 120-2. The relay device 120-2 is previously divided in its function into modules so that these wavelength dropping and adding portions can be added and that connectors for connecting other modules to be added thereto can be provided. This module structure will help the later upgrading operation be made with ease.

Figure 7:
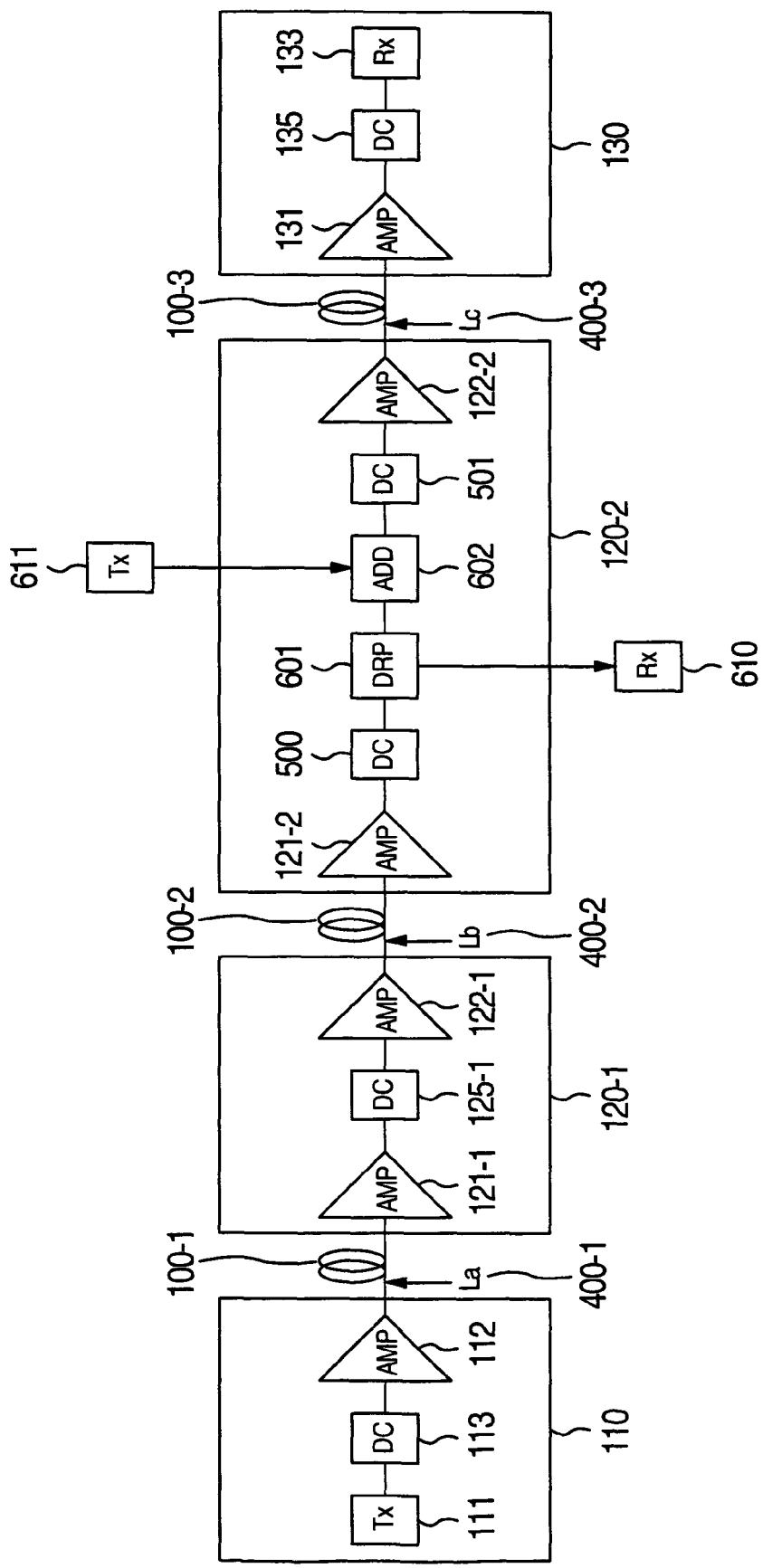
FIG. 7 is a diagram to which reference is made in explaining the second embodiment of the invention.

FIG. 7 shows the construction of a transmission system that has the OADM function achieved by using the device 120-2 graded as in FIG. 6. The wavelength-division multiplexed light received from the transmission line 100-2 is fed to an optical amplifier 121-2 where its loss caused in the fiber is recovered by the amplification. The amplified wavelength-division multiplexed light is supplied to the chromatic dispersion compensator 500, and compensated thereby for its chromatic dispersion caused in the remaining part of the transmission line 100-2 after the predetermined distance Lb 400-2. The compensated wavelength-division multiplexed light is fed to the waveform dropping portion 601, where an optical signal of a predetermined band is extracted from it. The extracted optical signal is supplied to an external device including an optical receiver 610. An optical signal from an external device including an optical transmitter 611 for producing the optical signal of a predetermined band is supplied to the wavelength adding portion 602, where it is multiplexed with the wavelength-division multiplexed light. The additionally multiplexed light is amplified by the optical amplifier 122-2, and then fed to the transmission line 100-3.

Under the above construction, the wavelength-division multiplexed light produced from the previous-stage chromatic dispersion compensator 500 has no chromatic dispersion because the chromatic dispersion the light had just when it was supplied to the upgraded relay device 120-2 was all compensated for by the compensator 500. Therefore, the optical signal received by the external device through the wavelength dropping portion 601 has its chromatic dispersion already similarly compensated for, or can be received as an excellent-characteristic optical signal with the chromatic dispersion compensated for. In addition, the following chromatic dispersion compensator 501 compensates the optical signal produced from the optical transmitter 611 for its chromatic dispersion caused in the range from the relay device 120-2 to the predetermined distance Lc 400-3 on the optical transmission line 100-3, and a chromatic dispersion compensator 135 of the receiving terminal 130 compensates this optical light for its chromatic dispersion caused in the remaining part of the transmission line 100-3 after the predetermined distance Lc 400-3. Therefore, the optical receiver 133 can receive the excellent-characteristic multiplexed light having all the chromatic dispersion compensated for.

A method of canceling out the chromatic dispersions caused in the wavelength dropping portion 601 and wavelength adding portion 602 will be described below. Even in the wavelength dropping and adding portions 601, 602, the optical signals that pass therethrough or that are dropped or added sometimes cause chromatic dispersion. This chromatic dispersion will be caused by mismatching among the connected optical fibers or among the components used in the optical amplifiers, and wavelength dropping and adding portions. The chromatic dispersion caused in the devices and components is in some case, not completely removed with ease, but can be adjusted to a predetermined amount by designing the group delay of each optical component. Therefore, if the chromatic dispersion occurring in a certain portion is tried to compensate by adjusting the chromatic dispersion in other portions, the chromatic dispersion can be probably overall compensated for.

For example, it is assumed that chromatic dispersion of +D occurs in the signal passing through the wavelength dropping portion 601 and that chromatic dispersion of +d occurs in the dropped signal. At this time, if the chromatic dispersion occurring in the signal passing through the following-stage wavelength adding portion 602 can be adjusted to be −D, the chromatic dispersions caused in the optical signals passing through the upgraded relay device 120-2 can be cancelled out to be zero.

In addition, if the optical signal that is to be dropped at the wavelength dropping portion 601 of the relay device 120-2 can be adjusted for its chromatic dispersion to be −d when it passes through the wavelength-division multiplexer that is, though not shown, mounted in the transmitting terminal 110, the chromatic dispersions caused in the dropped optical signal can be cancelled out to be zero at the wavelength dropping portion 601.

Figure 8:
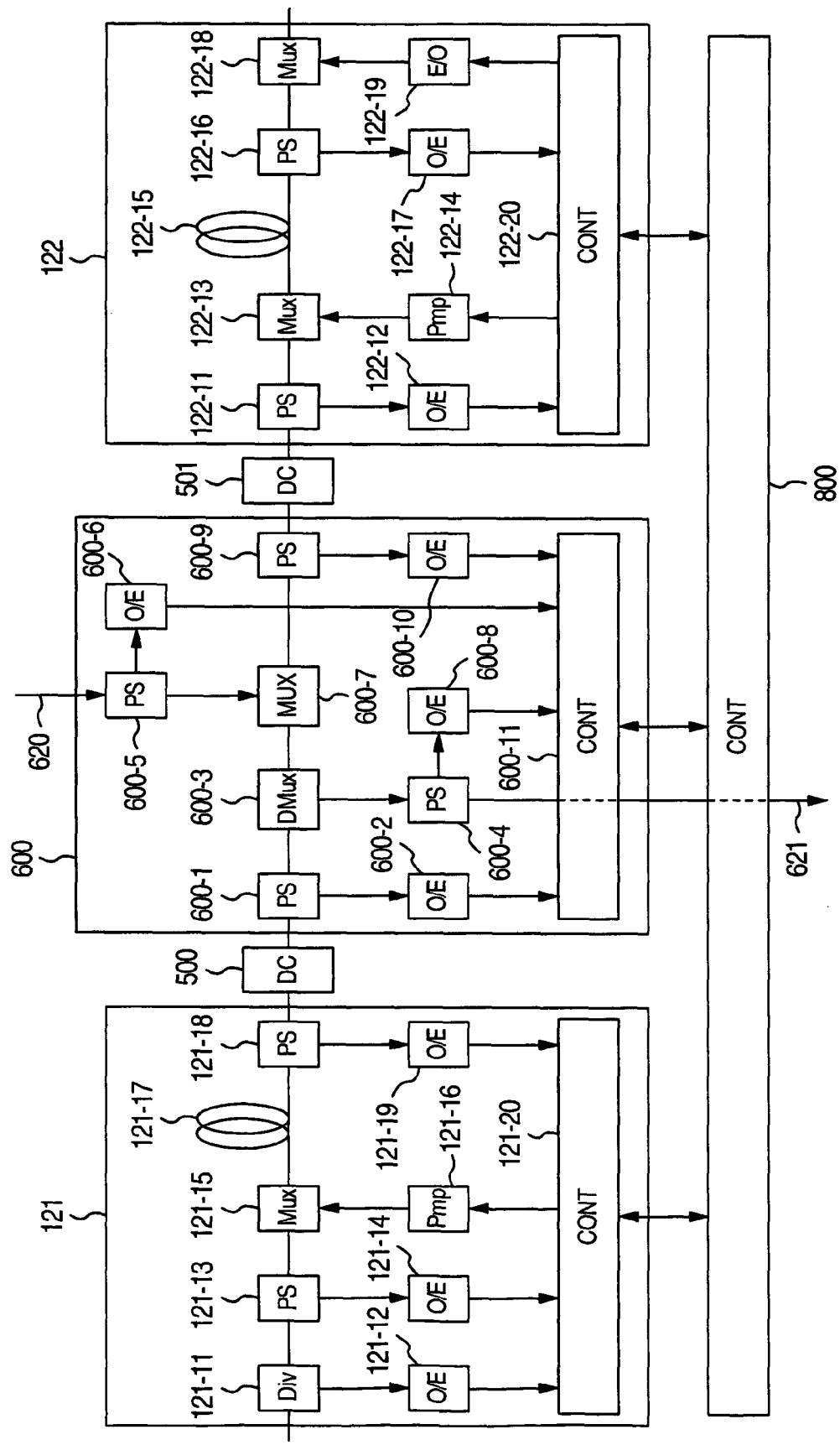
FIG. 8 is a detailed diagram to which reference is made in explaining the second embodiment of the invention.

FIG. 8 shows an example of the detailed construction of the upgraded optical relay device 120 in which the OADM function is mounted as illustrated in FIG. 6.

In the pre-stage amplifier 121, an optical supervisory channel signal (OSC light) that includes wavelength number information and so on is extracted from the input optical wavelength-division multiplexed signal by a wavelength divider 121-11, and the optical supervisory channel signal is fed to and converted by an opto-electric converter 121-12 into an electric signal, which is then fed to a controller 121-20. The input wavelength-division multiplexed light passed through the wavelength divider 121-11 is fed to a power splitter 121-13, where the optical power is separated. The optical power is converted into an electric signal by use of an opto-electric converter 121-14, and then fed to the controller 121-20.

Similarly, the output optical power is separated by use of a power splitter 121-18. The separated optical power is converted into an electric signal by using an opto-electric converter 121-19, and then fed to the controller 121-20. In addition, the pumping light from a pumping laser diode 121-16 is multiplexed with the wavelength-division multiplexed light by a pumping light multiplexer 121-15. The wavelength-division multiplexed light is then fed to an amplifying doped fiber 121-17, where it is amplified.

The controller 121-20 of the input-side optical amplifier 121 uses the optical power of the input signal, the optical power of the output signal, the wavelength number information included in the OSC light or the control signal from a device controller 800 which will be described later to control the pumping laser diode 121-16 to generate the pumping power so that an optimum gain can be obtained in the amplifying doped fiber 121-17.

Similarly, in the output-side amplifier 122, the optical power is separated by a power splitter 122-11, and converted by an opto-electric converter 122-12 into an electric signal, which is then supplied to a controller 122-20. In addition, the output optical power is separated by a power splitter 122-16. The separated optical power is converted by an opto-electric converter 122-17 into an electric signal, which is then fed to the controller 122-20. The pumping light from a pumping laser diode 122-14 is multiplexed with the wavelength-division multiplexed light by a pumping light multiplexer 122-13. The resulting wavelength-division multiplexed light is amplified by an amplifying doped fiber 122-15.

The controller 122-20 uses the optical power of the input signal, the optical power of the output signal or a control signal from the device controller 800 which will be described later to control the pumping laser diode 122-14 to generate the pumping power so that an optimum gain can be obtained in the amplifying doped fiber 122-15. In addition, the control information from the device controller and other control information for use in the following devices are supplied through an electro-optical converter 122-19 to a wavelength multiplexer 122-18, where it is multiplexed with the wavelength-division multiplexed light.

In an add drop portion 600 added for upgrade between the chromatic dispersion compensators 500, 501, the input optical power is separated by a power splitter 600-1. The separated optical power is converted by an opto-electric converter 600-2 into an electric signal, which is then transmitted to a controller 600-11. Similarly, the optical power of the output light is separated by use of a power splitter 600-9. The separated optical power is converted by an opto-electric converter 600-10 into an electric signal, which is then supplied to the controller 600-11.

The signal light of a band to be dropped by this add drop portion 600 is separated by a demultiplexer 600-3, and supplied through a power splitter 600-4 to the outside as a dropped signal 621. In addition, the optical power of the branched signal is extracted by the power splitter 600-4, and converted by an opto-electric converter 600-8 into an electric signal, which is then transmitted to the controller 600-11.

Signal light 620 of a band to be added from the outside by the add drop portion 600 is multiplexed by a multiplexer 600-7 through a power splitter 600-5. In addition, the optical power of the added signal 620 is extracted by the power splitter 600-5, and converted by an opto-electric converter 600-6 into an electric signal, which is then fed to the controller 600-11. The optical supervisory channel signals from the pre-stage amplifier 121, post-stage amplifier 122 and add drop portion 600 are transmitted to the device controller 800.

Since it cannot be decided, by only monitoring the optical power, whether the optical power is insufficient or the optical power is observed to be small because of, originally, a small wavelength multiplex number, the wavelength number information received by the input-side amplifier 121 is used, making it possible to control the input-side amplifier 121 to properly amplify the power. The wavelength multiplex number to the output-side amplifier 122 can be computed on the device controller 800 by using the wavelength number information to the input-side amplifier 121, and the number of dropped wavelengths and the number of added wavelengths processed by the add drop portion 600 as follows.

(Number of multiplexed wavelengths to the output-side amplifier)=(Number of multiplexed wavelengths to the input-side amplifier)−(Number of dropped wavelengths)+(Number of added wavelengths)    [Equation 1]

A method for the chromatic dispersion compensation further using the function to compensate for a gain tilt will be described as the third embodiment of the invention.

Figure 9:
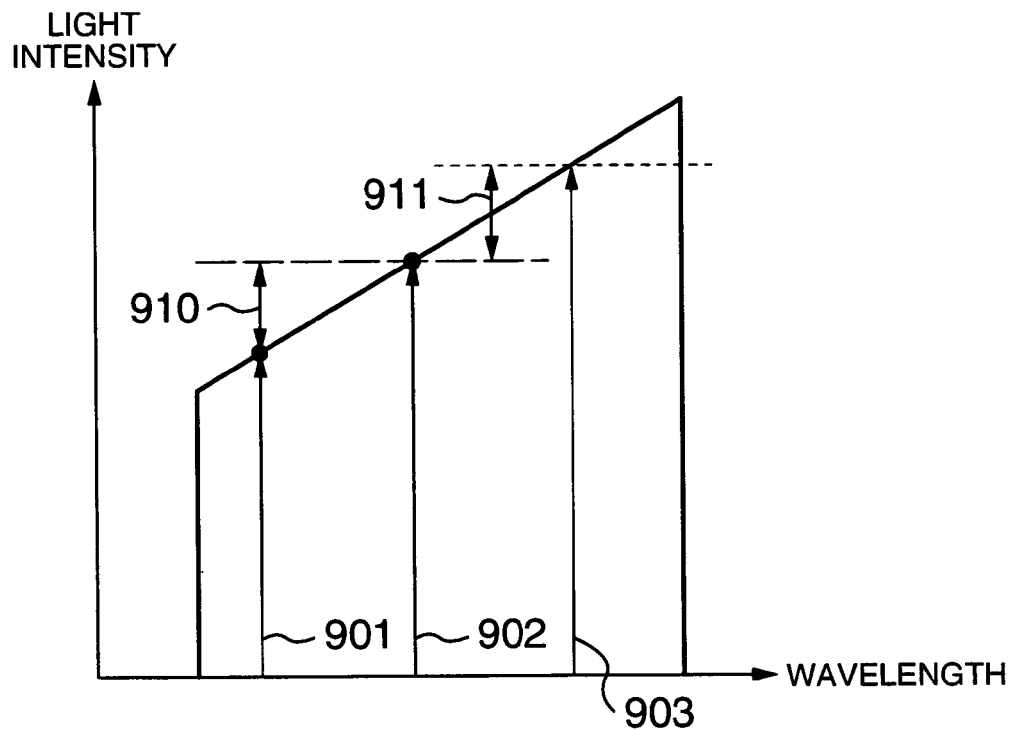
FIG. 9 is a diagram to which reference is made in explaining the problems with the third embodiment of the invention.

FIG. 9 is a diagram to which reference is made in explaining the gain tilt caused in the optical amplifier. Since the gain of the optical amplifier depends on the wavelength, the light intensities of the multiplexed optical signals sometimes have a difference depending on their wavelengths. If a wavelength 902 at around the center of the wavelength band of the optical signals multiplexed as multiplexed light is compared with a wavelength 901 that is shorter than the wavelength 902 as, for example, shown in FIG. 9, it will be seen that the signal intensity of the wavelength 901 is weaker than the wavelength 902 because an intensity difference 910 occurs between them. As a result, the optical S/N ratio might be reduced.

In addition, it will be seen that the intensity of the wavelength 903 becomes larger than that of wavelength 902, thus causing a light-intensity difference 911. Thus, the wavelength 903 is more influenced by the nonlinear effect within the optical fiber. Because of these phenomena, it is difficult to make the signal quality uniform over all the wavelengths that are bundled within the wavelength-division multiplexed light.

Figure 10:
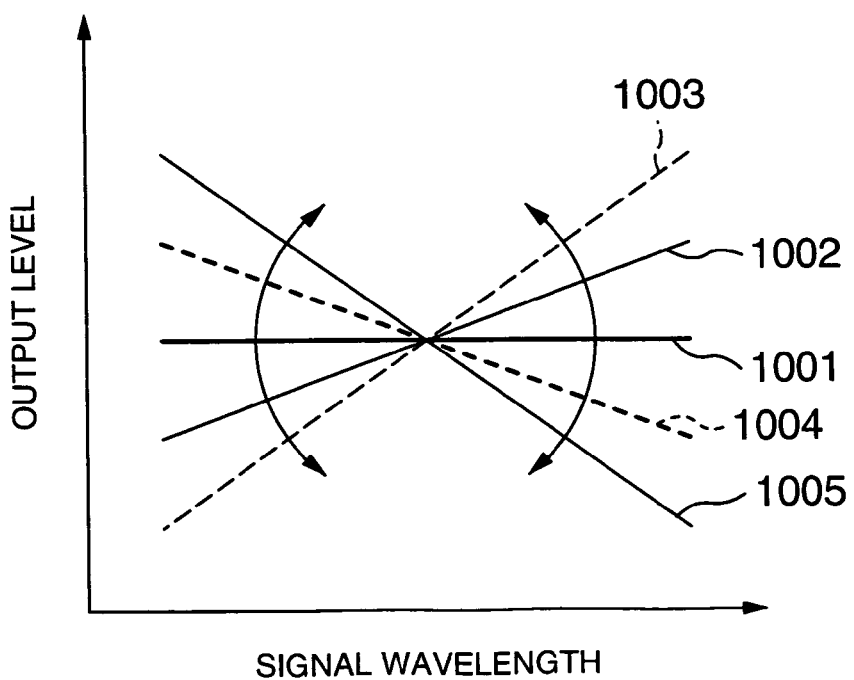
FIG. 10 is a diagram to which reference is made in explaining the problems with the third embodiment of the invention.

FIG. 10 is a diagram to which reference is made in explaining the operation of a gain tilt equalizer for reducing the inter-wavelength gain tilt shown in FIG. 9. The gain tilt equalizer equalizes the above light-intensity difference between the wavelengths. When the light intensity of longer wavelengths is larger than that of shorter wavelengths (upward-sloping characteristic) as shown in FIG. 9, control is made so that a characteristic to decrease the light intensity of longer wavelength side as indicated by 1004 or 1005 in FIG. 10 can be obtained to cancel out the upward-sloping characteristic. Contrarily, when the light intensity of shorter wavelengths is larger than that of longer wavelengths (downward-sloping characteristic), control is carried out so that a characteristic to increase the light intensity of longer wavelength side as indicated by 1002 or 1003 can be obtained to cancel out the downward-sloping characteristic. In addition, the amount of control in the gain tilt equalizer is changed as at 1004 or 105 according to the magnitude of the light-intensity difference caused in the optical amplifier.

Figure 11:
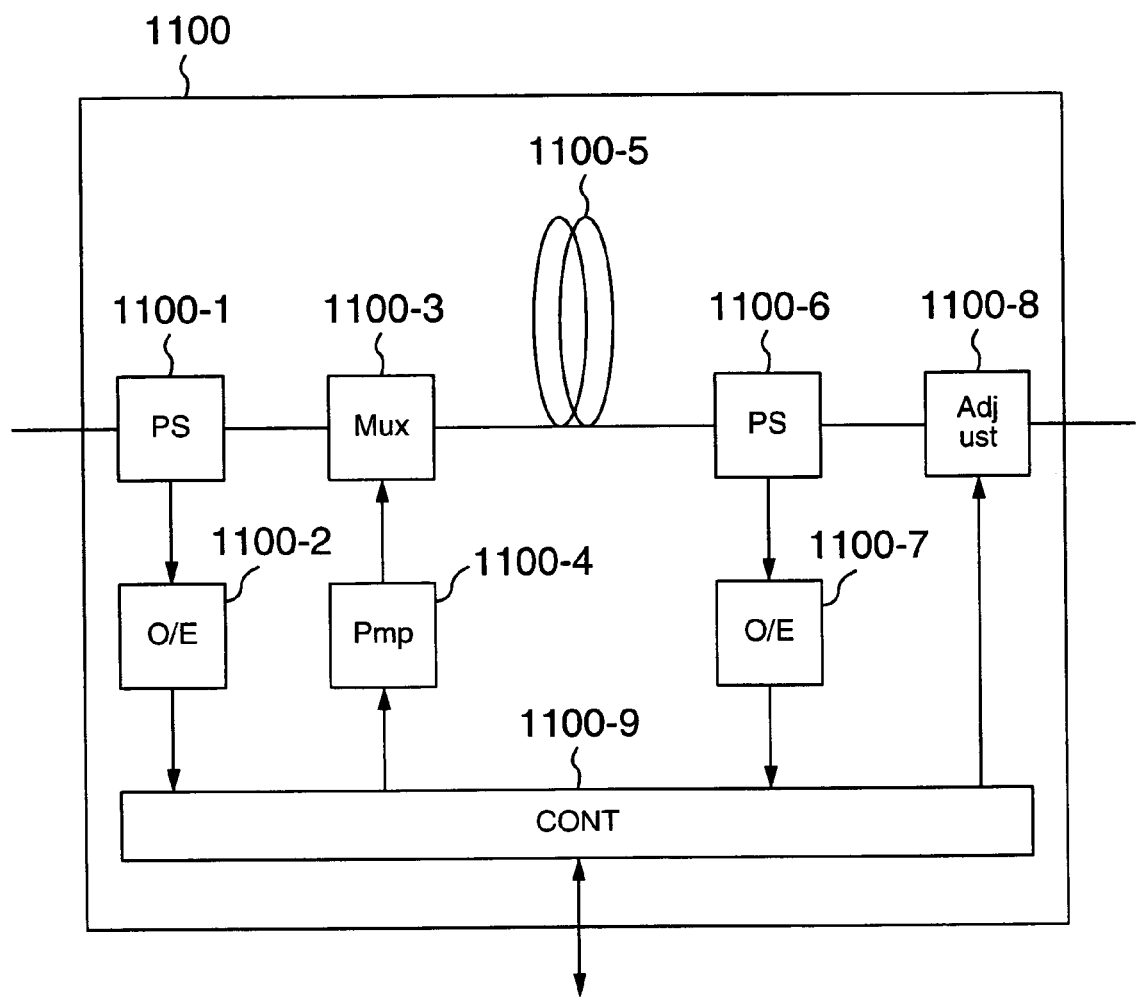
FIG. 11 is a diagram to which reference is made in explaining the third embodiment of the invention.

FIG. 11 shows one example of the optical amplifier with the gain tilt equalizer of FIG. 10 mounted. A gain tilt equalizer 1100-8 is mounted to equalize the gain tilt caused in an amplifying doped fiber 1100-5. The output light from the amplifying doped fiber 1100-5 is supplied to a power splitter 1100-6, where the optical power is extracted. The extracted optical power is supplied through an opto-electric converter 1100-7 to a controller 1100-9 as optical power information of the output light. The controller 1100-9 controls the output power of a pumping laser diode 1100-4 so that the power of the output light is a predetermined value. A pumping multiplexer 1100-3 multiplexes it with the wavelength-division multiplexed light, and supplies the resulting light to the amplifying doped fiber 1100-5.

The gain tilt equalizer 1100-8 is controlled by a control signal from the controller 1100-9. The gain tilt of the amplifying doped fiber 1100-5 is generally dependent on the power of the input light. In addition, the power of the input light can be observed by using a power splitter 1100-1 and an opto-electric converter 1100-2 as is the optical power of the output light. Therefore, if the gain tilt characteristic of the amplifying doped fiber 1100-5 responsive to the input light power is previously acquired by measurement, simulation or the like and stored in a parameter memory, not shown, within the controller 1100-9, the gain tilt of amplifying doped fiber 1100-5 based on the optical power of the input light can be automatically adjusted.

Figure 12:
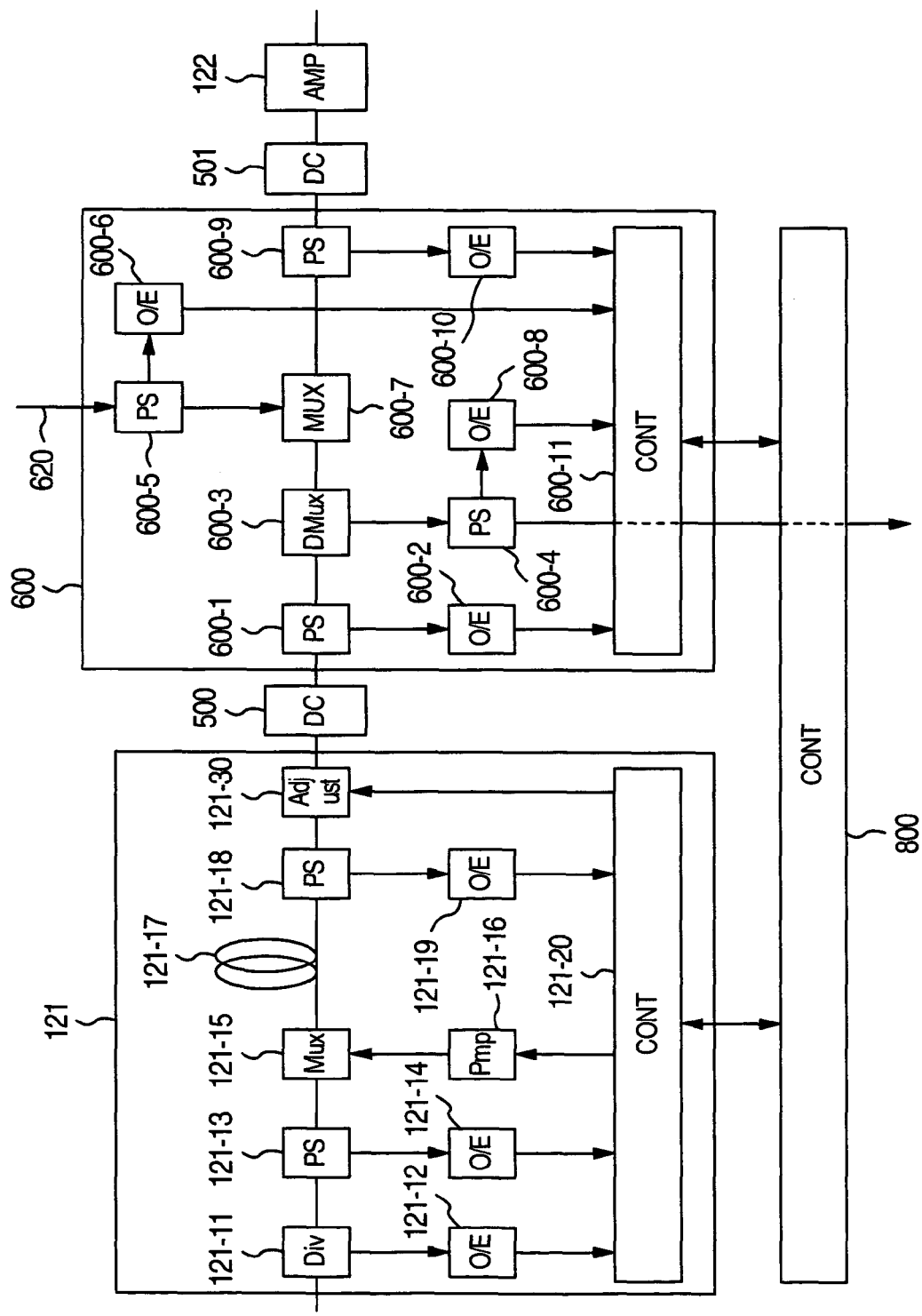
FIG. 12 is a detailed diagram to which reference is made in explaining the third embodiment of the invention.

FIG. 12 shows an example of an add drop unit having means for directly observing the gain tilt caused in the amplifying doped fiber and applying it to the control of the gain tilt equalizer. This add drop unit has the optical amplifier 121 on the input side and the add drop portion 600 on the output side like the construction of FIG. 8. The optical amplifier 121 has a gain tilt equalizer 121-30 at its output end. In FIG. 12, the details of the control of the gain tilt equalizer 121-30 is particularly shown. The internal arrangement and operation of the optical amplifier 122 are the same as described previously.

The add drop portion 600 has the optical power detecting opto-electric converter 600-2 to which the input signal is fed, and the optical power detecting opto-electric converter 600-8 to which the dropped signal is supplied. The optical power signals from those converters are supplied through the controller 600-11 to the device controller 800.

Moreover, in the input-side optical amplifier 121, the multiplexed-wavelengths number information included in the optical supervisory channel light (OSC light) that the wavelengths multiplexed light includes is extracted by the supervisory channel wavelength divider 121-11 and opto-electric converter 121-12, and fed through the controller 121-20 to the device controller 800.

In the device controller 800, the input optical power detected by the opto-electric converter 600-2 of the add drop portion 600 is divided by the multiplexed-wavelengths number information from the input-side optical amplifier 121, thus making it possible to compute the average light intensity of all the wavelengths-multiplexed light. For example, the average light intensity corresponds to the light intensity 902 at around the central wavelength in FIG. 9.

In addition, the light intensity of the optical signal dropped at the add drop portion 600 corresponds to, for example, the light intensity 901 of the shorter wavelength side light shown in FIG. 9 if the band of the dropped signal is on the shorter wavelength side of the multiplexed light. If the band is on the longer wavelength side of the multiplexed light, the light intensity corresponds to the light intensity 903 of the longer wavelength side light. Therefore, in the device controller 800, the gain tilt 910 or 911 can be computed by using the light intensity information fed from the controller 600-11 of the add drop portion 600.

The above gain tilt is supplied from the device controller 800 to the controller 121-20 of the input-side optical amplifier 121, thus controlling the gain tilt equalizer 121-30 to reduce the gain tilt to zero. Thus, the signal quality can be kept uniform over all the wavelengths bundled within the wavelength-division multiplexed light.

Figure 13:
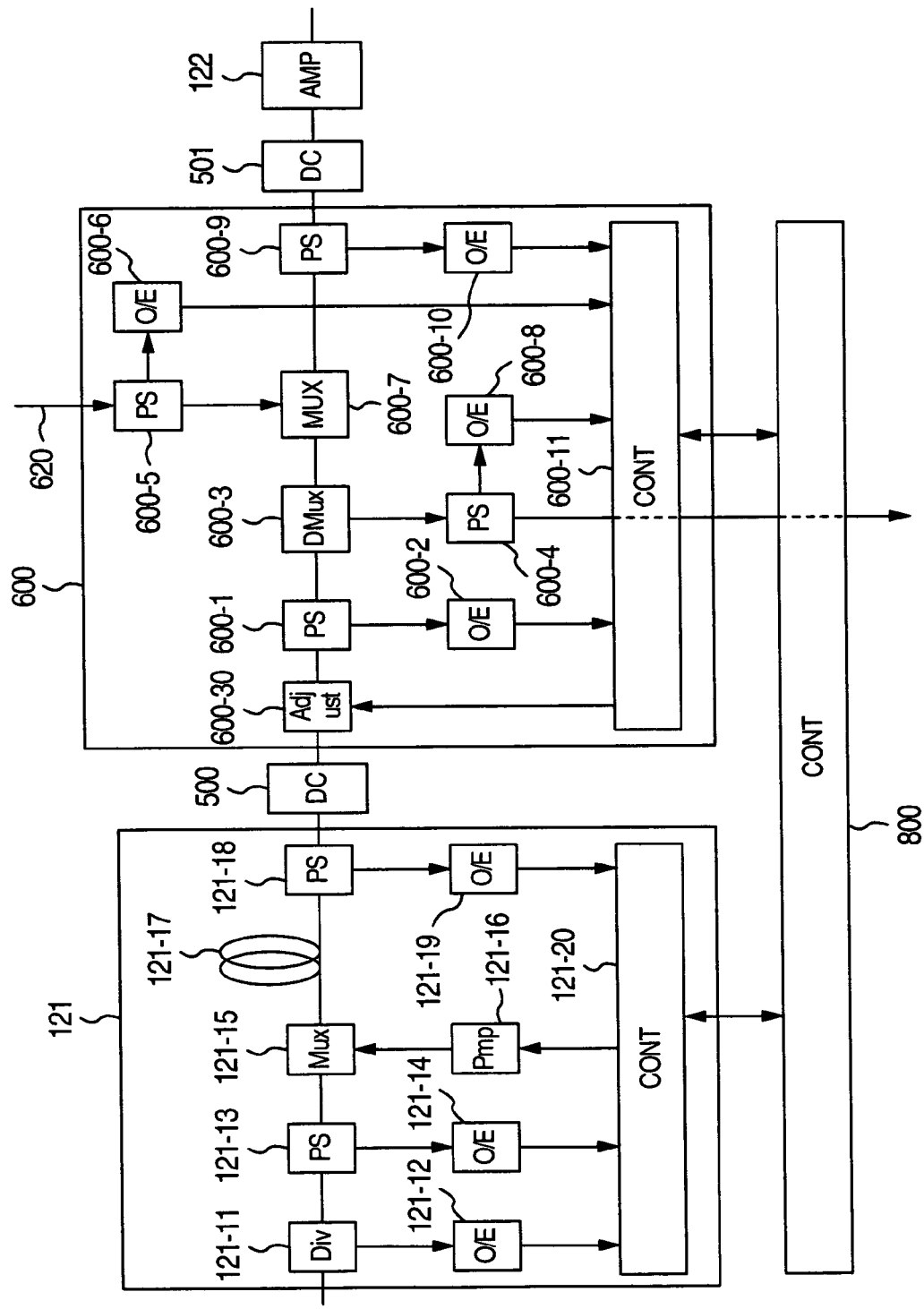
FIG. 13 is a diagram to which reference is made in explaining other modifications of the third embodiment of the invention.

FIG. 13 shows an example of a construction having a gain tilt equalizer 600-30 provided in the add drop portion 600. Even with this construction, the gain tilt of the multiplexed light to the add drop portion 600 can be estimated by the device controller 800 in the same way as in FIG. 12.

The gain tilt is supplied from the device controller 800 to the controller 600-11, thus controlling the gain tilt equalizer 600-30 to reduce the gain tilt to zero. Thus, the signal quality can be kept uniform over all the wavelengths bundled within the multiplexed light.

Thus, according to the invention, the wavelength-division multiplexing system having the optical add drop multiplexer (OADM) can make the signal qualities before and after the connection of OADM the same over all the wavelengths bundled within the multiplexed light without altering the chromatic dispersion method.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical transmission apparatus for transmitting a wavelength-division multiplexed light from a first optical transmission line to a second optical transmission line, comprising:
    a first optical amplifier for amplifying a first wavelength-division multiplexed light received from the first optical transmission line;
    a first chromatic dispersion compensator for compensating for chromatic dispersion of said first wavelength division multiplexed light caused during the transmission of said first wavelength-division multiplexed light from a first predetermined position on said first optical transmission line to said optical transmission apparatus;
    an add drop portion for dropping an optical signal of a predetermined band from said first wavelength-division multiplexed light and adding an optical signal of a certain band with said first wavelength division multiplexed light and outputting a second wavelength-division multiplexed light;
    a second chromatic dispersion compensator for compensating for chromatic dispersion of said second wavelength division multiplexed light caused during the transmission of said second wavelength-division multiplexed light between said optical transmission apparatus and a second predetermined position on said second optical transmission line;
    a second optical amplifier for amplifying said second wavelength division multiplexed light output from the second chromatic dispersion compensator; and
    a controller for controlling said first optical amplifier by in response to a first number of wavelengths included in said first wavelength-division multiplexed light and for controlling said second optical amplifier in response to a second number of wavelengths included in said second wavelength-division multiplexed light, wherein the second number is computed by subtracting number of dropped wavelengths in said optical signal of a predetermined band as dropped by said add drop portion from said first number and adding number of added wavelengths in said certain band as added by said add drop portion.

2. An optical transmission apparatus according to claim 1, wherein said first number of wavelengths is extracted by the optical transmission apparatus from an optical supervisory channel signal included in said first wavelength-division multiplexed light.

3. An optical transmission apparatus for transmitting a wavelength-division multiplexed light from a first optical transmission line to a second optical transmission line, comprising:
    an optical amplifier for amplifying said wavelength-division multiplexed light received from said first optical transmission line;
    a first chromatic dispersion compensator for compensating for chromatic dispersion caused during the time in which said wavelength-division multiplexed light produced from said optical amplifier is transmitted from a first predetermined position on said first optical transmission line to said optical transmission apparatus;
    an add drop portion for dropping an optical signal of a predetermined band from said wavelength-division multiplexed signal produced from said first chromatic dispersion compensator, and for multiplexing an optical signal of a certain band with said wavelength-division multiplexed light from which said optical signal of said predetermined band has been dropped;
    a second chromatic dispersion compensator for compensating for chromatic dispersion caused during the time in which said wavelength-division multiplexed light produced from said add drop portion is transmitted between said optical transmission apparatus and a second predetermined position on said second optical transmission line;
    a gain tilt compensator for compensating for the gain tilt between the wavelength of the output signal from said optical amplifier;
    an optical power detector for detecting an optical power of said wavelength division multiplexed light fed to said optical amplifier;
    means for extracting information as to number of wavelengths multiplexed in the wavelength-division multiplexed light received at the optical amplifier, from an optical supervisory channel signal included in said received wavelength-division multiplexed light; and
    a controller for controlling said gain tilt compensator according to said extracted wavelength multiplex number information, an optical power detected by said optical power detector, and pre-stored gain tilt characteristics of said optical amplifier.

4. An optical transmission apparatus according to claim 3, wherein said pre-stored gain tilt characteristics indicate relationships between gain tilt characteristics of said optical amplifier and light power input to said optical amplifier.

5. An optical transmission apparatus for transmitting wavelength-division multiplexed light from a first optical transmission line to a second optical transmission line, comprising:
    an optical amplifier for amplifying wavelength-division multiplexed light received from said first optical transmission line;

a first chromatic dispersion compensator for compensating for chromatic dispersion caused during the time in which the wavelength-division multiplexed light received at the optical amplifier was transmitted from a first predetermined position on said first optical transmission line to said optical transmission apparatus;

an add drop portion for dropping an optical signal of a predetermined band from a wavelength-division multiplexed light produced from said first chromatic dispersion compensator, and for multiplexing an optical signal of a certain band with wavelength-division multiplexed light from which said optical signal of said predetermined band has been dropped;

a second chromatic dispersion compensator for compensating for chromatic dispersion caused during the time in which wavelength-division multiplexed light produced by the multiplexing in said add drop portion will be transmitted between said optical transmission apparatus and a second predetermined position on said second optical transmission line;

a gain tilt compensator for compensating for the gain tilt between the wavelengths of an output signal from said optical amplifier;

means for detecting optical power of the wavelength-division multiplexed light fed to said add drop portion from said first chromatic dispersion compensator;

means for detecting the optical power of said dropped signal;

means for extracting information as to number of wavelengths multiplexed in the wavelength-division multiplexed light received at the optical amplifier, from an optical supervisory channel signal included in said received wavelength-division multiplexed light; and a controller for controlling said gain tilt compensator;

wherein said controller controls said gain tilt compensator to estimate the gain tilt between the wavelengths of the wavelength-division multiplexed light fed to said add drop portion using said extracted wavelength multiplex number information, said detected optical power of said wavelength-division multiplexed light fed to said add drop portion and the detected optical power of said dropped signal, and to compensate for said gain tilt.

* * * * *